(12) United States Patent
Hammerstrom

(10) Patent No.: US 8,258,761 B2
(45) Date of Patent: Sep. 4, 2012

(54) ELECTRICAL ENERGY CONSUMPTION CONTROL APPARATUSES AND ELECTRICAL ENERGY CONSUMPTION CONTROL METHODS

(75) Inventor: Donald J. Hammerstrom, West Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 494 days.

(21) Appl. No.: 12/181,954

(22) Filed: Jul. 29, 2008

(65) Prior Publication Data

US 2009/0033296 A1 Feb. 5, 2009

Related U.S. Application Data

(60) Provisional application No. 60/952,929, filed on Jul. 31, 2007.

(51) Int. Cl.
*G05F 1/70* (2006.01)
*H02J 3/18* (2006.01)

(52) U.S. Cl. ............... 323/207; 307/24; 307/31; 307/52

(58) Field of Classification Search .................... 307/31, 307/126, 24, 32–35, 52–63; 323/205, 207
See application file for complete search history.

(56) References Cited

U.S. PATENT DOCUMENTS

| | | | |
|---|---|---|---|
| 4,320,306 A * | 3/1982 | Kohga et al. | 307/51 |
| 4,467,259 A | 8/1984 | Duff | |
| 4,905,134 A * | 2/1990 | Recker et al. | 363/98 |
| 5,126,585 A | 6/1992 | Boys | |
| 5,351,180 A * | 9/1994 | Brennen et al. | 363/71 |
| 5,424,936 A | 6/1995 | Reddy | |
| 5,574,356 A * | 11/1996 | Parker | 323/207 |
| 5,608,276 A * | 3/1997 | Suelzle | 307/152 |
| 5,625,548 A | 4/1997 | Gold et al. | |
| 5,642,270 A | 6/1997 | Green et al. | |
| 5,684,686 A | 11/1997 | Reddy | |
| 5,694,307 A | 12/1997 | Murugan | |
| 5,726,873 A | 3/1998 | Gold et al. | |

(Continued)

FOREIGN PATENT DOCUMENTS

WO PCT/US2008/071703 2/2010

OTHER PUBLICATIONS

Hammerstrom, DJ et al., Controller Design of Power Quality-Improving Appliances, Power Electronics Specialists Confedrence, 2007, PESC 2007, IEEE, IEEE, PI, Jun. 17, 2007, pp. 1-9, XP031218450.

(Continued)

*Primary Examiner* — Gary L Laxton
(74) *Attorney, Agent, or Firm* — Wells St. John, P.S.

(57) ABSTRACT

Electrical energy consumption control apparatuses and electrical energy consumption control methods are described. According to one aspect, an electrical energy consumption control apparatus includes processing circuitry configured to receive a signal which is indicative of current of electrical energy which is consumed by a plurality of loads at a site, to compare the signal which is indicative of current of electrical energy which is consumed by the plurality of loads at the site with a desired substantially sinusoidal waveform of current of electrical energy which is received at the site from an electrical power system, and to use the comparison to control an amount of the electrical energy which is consumed by at least one of the loads of the site.

35 Claims, 8 Drawing Sheets

U.S. PATENT DOCUMENTS

| | | | |
|---|---|---|---|
| 5,731,965 | A | 3/1998 | Cheng et al. |
| 5,821,742 | A | 10/1998 | Carr et al. |
| 5,861,683 | A * | 1/1999 | Engel et al. ............. 307/38 |
| 5,953,224 | A | 9/1999 | Gold et al. |
| 6,182,017 | B1 | 1/2001 | Xu |
| 6,215,202 | B1 | 4/2001 | Luongo et al. |
| 6,215,316 | B1 | 4/2001 | Xu |
| 6,262,569 | B1 | 7/2001 | Carr et al. |
| 6,297,980 | B1 | 10/2001 | Smedley et al. |
| 6,380,719 | B2 * | 4/2002 | Underwood et al. ........ 322/36 |
| 6,512,966 | B2 | 1/2003 | Lof et al. |
| 6,545,887 | B2 | 4/2003 | Smedley et al. |
| 6,624,532 | B1 * | 9/2003 | Davidow et al. ........... 307/39 |
| 6,671,585 | B2 | 12/2003 | Lof et al. |
| 6,717,465 | B2 | 4/2004 | Chou et al. |
| 6,778,414 | B2 | 8/2004 | Chang et al. |
| 6,876,178 | B2 | 4/2005 | Wu et al. |
| 6,876,179 | B2 | 4/2005 | Chou et al. |
| 6,919,717 | B2 | 7/2005 | Ghassemi |
| 6,924,992 | B2 | 8/2005 | Gaudin et al. |
| 6,982,546 | B2 | 1/2006 | Wu et al. |
| 7,015,679 | B2 | 3/2006 | Ryba et al. |
| 7,038,329 | B1 * | 5/2006 | Fredette et al. ........... 290/40 C |
| 7,091,704 | B2 | 8/2006 | Chou et al. |
| 7,183,751 | B2 | 2/2007 | Wu et al. |
| 7,187,149 | B1 | 3/2007 | Balog, Jr. et al. |
| 7,272,026 | B2 | 9/2007 | Chou et al. |
| 7,301,787 | B2 | 11/2007 | Wu et al. |
| 7,635,967 | B2 * | 12/2009 | Loucks et al. ............ 322/18 |

OTHER PUBLICATIONS

Key, T et al., Comparison of Standards Limiting Harmonic Distortion in Power Systems, Proceedings of the Industrial & Commercial Power Systems Technical Conference, Memphis, May 6-9, 1991; Proceedings of the Industrial & Commercial Power Systems Technical Conference, New York, IEEE, US, vol -, pp. 57-62, XP010044722.

PCT International Search Report and Written Opinion.

* cited by examiner

ELECTRICAL ENERGY CONSUMPTION CONTROL APPARATUSES AND ELECTRICAL ENERGY CONSUMPTION CONTROL METHODS

This invention claims priority from a provisional patent application entitled "Device, Method, and System for Improving The Electrical Efficiency of Electrical Appliances", application No. 60/952,929 filed Jul. 31, 2007 incorporated herein in its entirety.

This invention was made with Government support under Contract DE-AC0576RLO1830 awarded by the U.S. Department of Energy. The Government has certain rights in the invention.

BACKGROUND OF THE INVENTION

1. Field of the Invention

The invention generally relates to the improvement of electrical power factor and harmonic power quality at the interface between an electric utility and a utility customer site through the active control of one or more electric appliances at the utility customer's site.

2. Background Information

In the field of electrical power transmission, electrical energy is typically delivered to the electrical consumer as a 60-hz voltage signal. Certain loads, like the inexpensive power rectifier power supplies that are typically supplied with small appliances and computer equipment, pollute the local harmonic content of the electrical supply. Certain applications and facilities such as research facilities and hospitals can be particularly sensitive to the presence of this harmonic pollution. This electrical pollution can decrease the overall distribution grid efficiency and in some cases cause these utilities to over design their distribution and transmission infrastructure. Severe harmonic pollution from one customer's load can affect the performance of and harm a neighboring electrical power customer's loads. Various standards such as IEEE-519 restrict the non-fundamental harmonic components that can be reflected back into the electrical power grid by the electrical loads from these consuming devices. Most electric power customers pay the same for energy consumed by them regardless of its harmonic pollution content.

Harmonic pollution as addressed here includes non-unity power factor electrical currents and those electrical current harmonics above the fundamental 60-Hz AC (alternating current) frequency used in the electrical power distribution system. Reductions in power factor are caused, for example, by rotating induction machines of the type found in clothes washers, dryers, dishwashers, and in refrigeration compressors. Home electronics, computers, and battery chargers and other appliances that possess inexpensive rectifiers, both reduce power factor and create harmonic current pollution at the sites where they reside. The growing abundance of computers and these other appliances in homes and businesses now threatens to become an unchecked, growing source of reduced electric power factor and increased harmonic power quality pollution.

Generally speaking, poor power factor and harmonic pollution from individual residential and commercial appliances can aggregate to become problematic for utilities on distribution feeders. Poor power factor may be mitigated at individual appliances by active power factor correction. Several commercial power factor correction integrated circuits may now be applied to the designs of battery chargers and universal power supplies to force their rectifier stages to consume unity power factor current. Both power factor and harmonic pollution may be corrected at the site-level by expensive power electronic harmonic correctors or, to a lesser degree, by controlled, distributed capacitors. Thus far, such large and active filters have been applied to large commercial and industrial site loads due to their great expense. Unlike active filters and capacitor banks, the present invention does not require the use of electrical energy storage components. Capacitor banks are used at the feeder, substation-level to correct power factor and to reduce harmonic pollution loads, a portion of which would otherwise be passed along through the substation to further aggregate at the transmission levels. However, the utility capacitor bank performs a power factor correction only near the substation where it is located.

The effects of poor feeder-level power factor and harmonic pollution are poor voltage support, energy system inefficiency, and reduction in system component life. In addition, thermal losses in the system reduce overall system efficiency of the distribution system. The additional heat on the lines and transformers can also reduce the usable lifetimes of those power system components and can force de-rating of their capacities during heavy load conditions. What is needed therefore is a system and device that overcomes these problems and provides the desired results.

The present invention provides a cost effective and practical solution to address these issues. Additional advantages and novel features of the present invention will be set forth as follows and will be readily apparent from the descriptions and demonstrations set forth herein. Accordingly, the following descriptions of the present invention should be seen as illustrative of the invention and not as limiting in any way.

SUMMARY

The present invention is a system, method and device for controlling and modifying the current drawn by an electrical load in a way that will improve the electrical power factor and harmonic quality of at least a portion of an electrical power system. In one embodiment of the invention, the invention includes a controller device that monitors the electrical current entering a site and modifies or corrects power quality of the current by directing how power will be consumed by the appliances at a site to improve the harmonic and power factor qualities of the electrical current entering the site.

Depending upon the particular embodiment of the present invention, the controller device may be incorporated into any of a variety of devices. Examples of which may include, but are not limited to, an electric power supply, a battery charger, an electric or hybrid transportation vehicle, industrial fork lifts, a water heater, a stove, an oven, an electric space heater, or lighting. The controller device may include a slow feedback loop that satisfies any of a variety of needs including needs of the appliance process, the need for harmonic correction, the steady-state need for power factor correction, or any combination of process needs, harmonic correction, and steady-state power factor correction.

This device method and system may be appropriately modified for use in a variety of residential, commercial, and industrial applications. This device provides a variety of additional features including decreasing reliance of a utility on capacitor banks, increasing electrical distribution efficiency, reducing voltage support for a utility, allowing for retrofitting of the present invention on existing devices and systems, including various automotive and industrial applications, and doing so without the reliance on electrical energy storage.

In one embodiment of the invention, the method for improving the power quality at a site includes the step of conducting a current that supplements and corrects the sum of the other load currents in a designated area. This method may be implemented by a variety of types of devices that modify the current drawn by an electrical load so as to improve a site's aggregate power factor of its current waveform. This device preferably has a controller configured to selectively consume preselected energies having a designated characteristic.

While these controllers can be alternatively configured in a variety of embodiments, in one embodiment, the controller modifies the current drawn by an electrical load in a way that will improve the harmonic quality of a site's aggregate current waveform. In some embodiments, such a controller modifies the current drawn by an electrical load in a way that will improve a site's aggregate power factor of its current waveform. The controlled electric load may or may not possess electrical energy storage. These controllers may be implemented in a variety of types of devices such as consumer electronics or a transportation vehicle like an electric or hybrid transportation vehicle or industrial machinery such as a fork lift or other device. In other embodiments the controller and the electrical load possess no electrical energy storage.

In some embodiments the electrical load is a resistive electrical element, such as those found in water heaters, stoves, ovens, electric space heaters, dimmable lighting and other applications. In other embodiments the electrical load may result from dissipation in transistors. In some embodiments of the invention, the controller includes a slow feedback loop that satisfies process needs, the steady-state need for power factor correction, or both. In another embodiment of the invention, the controller that modifies the current drawn by an electrical load in a way that will improve a site's aggregate harmonic content of its current waveform. A controller may include an electrical energy storage device, such as the power supply for a battery charger, like those that are found in electric or hybrid transportation vehicles or industrial fork lifts. In other embodiments the controller and the electrical load possess no electrical energy storage.

In other embodiments the electrical load results from dissipation in transistors. In some embodiments such a device may also include a slow feedback loop that satisfies process needs, the steady-state need for harmonic current correction, or any combination of process needs, harmonic correction, and steady state power factor correction.

In summary, this invention improves the quality of the AC electrical current at the interface between a site and the utility that serves the site. A "power quality improving appliance" at that site will overcompensate for the aggregate poor power factor and harmonic pollution of any other appliances at the site. The net effect is that the site appears from the utility side to be an improved, if not ideal, consumer of electrical power. The power quality improving appliance can help the site meet and exceed IEEE 519 (or other local) power quality requirements placed on the site by the local utilities while serving mundane appliance functions, like the heating of water, for example.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions I have shown and described only the preferred embodiment of the invention, by way of illustration of the best mode contemplated for carrying out the invention. As will be realized, the invention is capable of modification in various respects without departing from the invention. Accordingly, the drawings and description of the preferred embodiment set forth hereafter are to be regarded as illustrative in nature, and not as restrictive.

DETAILED DESCRIPTION OF THE INVENTION

The following description includes the preferred best mode of one embodiment of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims. While the described invention is best applied to the correction of site-level current harmonics, similar principles may be applied to the correction of other elements or factors including local voltage harmonics.

According to example embodiments discussed herein, a system, method and device are disclosed for controlling and modifying the current drawn by an electrical load in a way that will improve the electrical power factor and harmonic quality of at least a portion of an electrical power system. In one embodiment, a controller device monitors the electrical current entering a site and modifies or corrects power quality of the current by directing how power will be consumed by the appliances at a site to improve the harmonic and power factor qualities of the electrical current entering the site.

In one embodiment of the invention, the invention improves the quality of the AC (alternating current) electrical current at the interface between a site and the utility that serves the site. In one configuration, an embodiment of the invention located at the site overcompensates for the aggregate poor power factor and harmonic pollution of any other appliances at the site. The net effect is that the site appears from the utility side to be an improved, if not ideal, consumer of electrical power. The power quality improving appliance can help the site meet and exceed IEEE 519 (or other local) power quality requirements placed on the site by the local utilities while serving mundane appliance functions, like the heating of water, for example.

Figure 1:
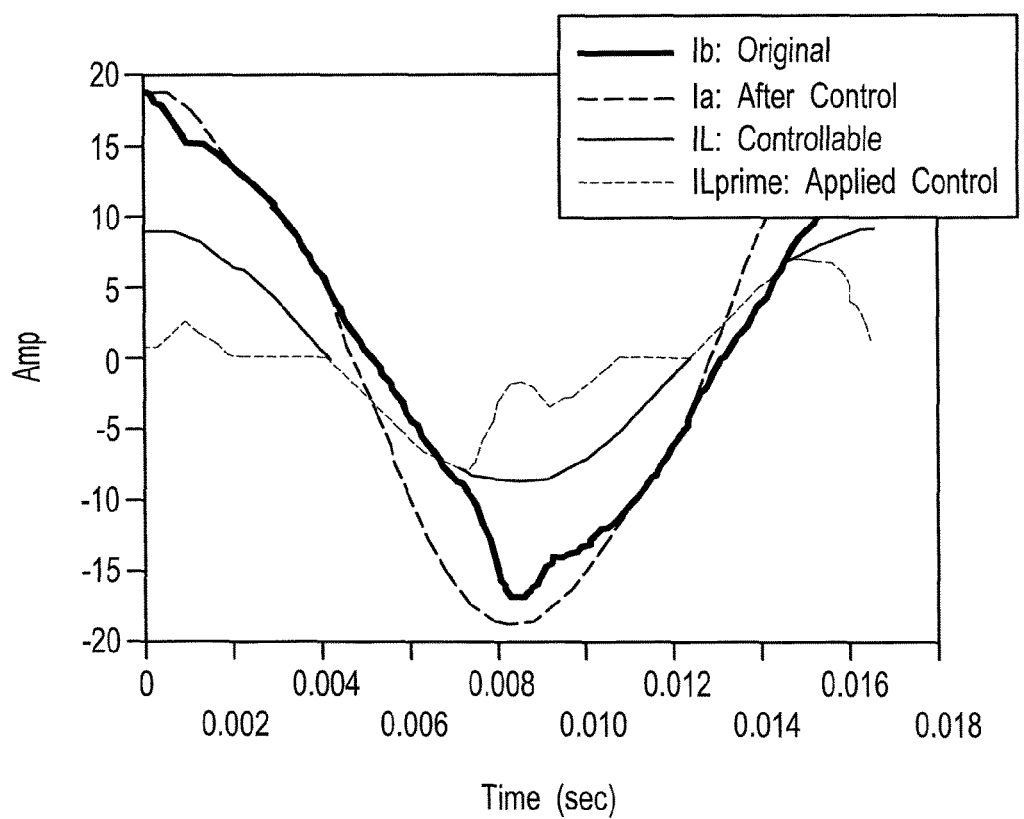
FIG. 1 is a chart showing waveforms demonstrating improvement in a site's current with a controlled power quality improving appliance of one embodiment of the present invention.

In one embodiment of the invention, the device of the present invention (described hereafter) is utilized to build current waveforms. Referring now to FIG. 1, a view of the representative waveforms present at a particular site from a circuit simulation is shown. Waveform $I_b$ is the original current draw that was measured at a residence having three personal computers without the device of the present invention operating. The signal $I_L$ is the envelope of total current that could be used by an appliance equipped with the present invention in this site. This resistive appliance current is necessarily in phase with the voltage (not shown) applied to the appliance. For example, the current envelope could be created by a water heater resistive heating element. The envelope represents the maximum current that the appliance could draw uncontrolled.

The signal $I_{L\,Prime}$ is the current drawn by the power quality improving appliance, the device of one embodiment of the present invention. This power quality improving appliance can draw up to the current magnitude shown in the signal $I_L$. This observation points out a unique control attribute of this embodiment of the power quality improving (PQI) appliance: the device need possess no significant energy storage and is therefore able to correct power quality through its opportunistic consumption of additional power at the right times within each half cycle. While this embodiment is shown in this application of the present embodiment, it is to be distinctly understood that the invention is not limited thereto but may be variously embodied according to the needs and necessities of a user.

Figure 2:
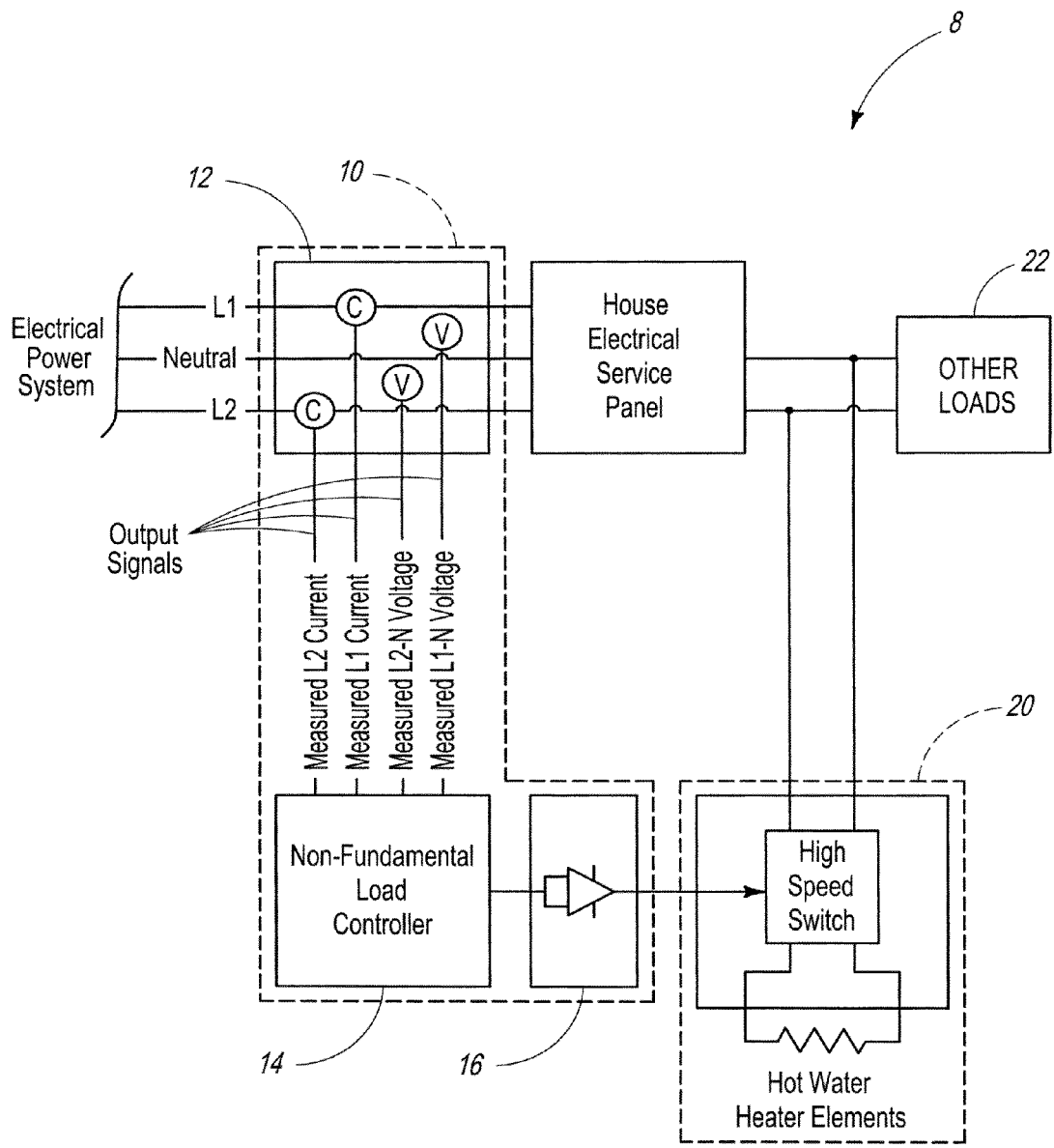
FIG. 2 is a functional block diagram of one embodiment of the present invention.

The signal $I_a$ is the sum of the site's aggregate line current plus the current drawn by the power quality improving appliance. This signal is "improved" in that it has higher power factor and less harmonic pollution than $I_b$, the site's current prior to applying the power quality improving appliance's load. The block configuration of the system of the present invention is set forth in FIG. 2. FIG. 2 shows an electrical energy consumption control apparatus 10 including monitoring circuitry 12 which includes a site current and voltage metering circuit, processing circuitry 14 including a control signal circuit, a power electronic circuit and power switch driver circuits 16. The site current and voltage metering circuit monitors and scales the site's line current and voltage. The control signal circuit uses the site's current, voltage, and another demand signal to control the appliance in which the present invention is connected. The power electronic circuit includes the power electronic switches and controls the power current into the appliance containing the device of the present invention. The power switch driver circuits drive the power electronic switches on and off, including necessary floating power sources and optical isolation. More detailed descriptions of these items are provided hereafter.

Figure 3:
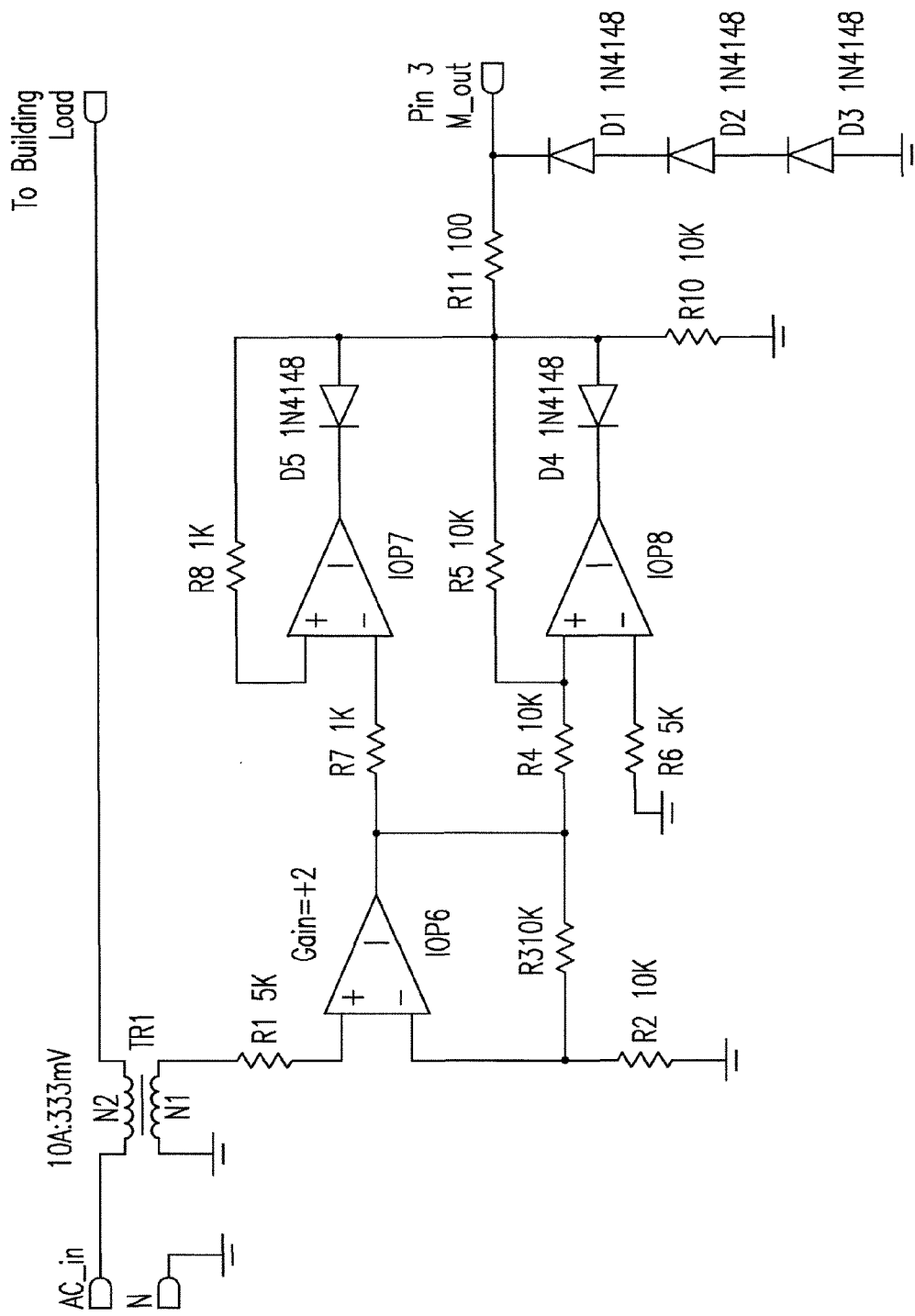
FIG. 3 is an example of one embodiment of a current sensing circuit.
Figure 4:
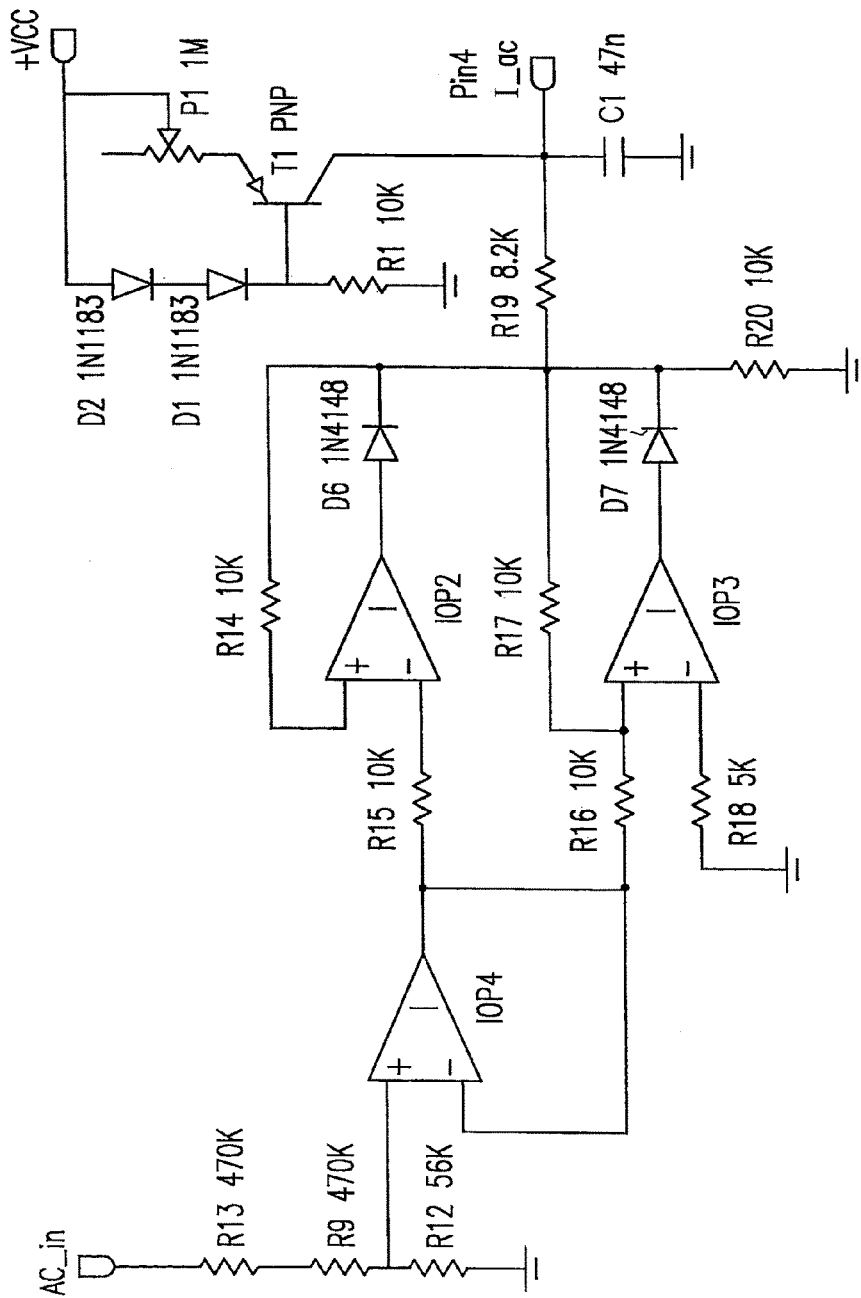
FIG. 4 is an example of another embodiment of an ac voltage monitoring circuit.

The site current and voltage metering circuit monitors the voltages and currents, preferably from a location near the site's electrical panel which provides the electrical energy to a plurality of loads including a controlled load 20 and other non-controlled loads 22. The voltage can be scaled by a voltage divider and then buffered. The current can be measured by using current transformers. The signals from both the current and voltage are then scaled and rectified through a precision rectifier for use by the control circuit. The site current and voltage metering circuit may be placed on the same circuit board as the control signal circuit. Both the current and voltage control signals are preferably immune from noise and free from phase shifts. The voltage signal is usually more sinusoidal than the current signal at the site electrical panel and may be filtered. It is preferred that the current signal sensor pass through all site current frequencies up to about 10 kHz, all of which can be mitigated by the power quality improving appliance. Example circuit components of the overall current and voltage metering circuit are shown in FIGS. 3 and 4. The current sensing circuit of FIG. 3 is configured to sense the current flowing to the loads of the site 8 and generate a signal which is indicative of the current of the electrical energy which is consumed by the loads and which may be provided to processing circuitry 14 per FIG. 2. The voltage sensing circuit of FIG. 4 is configured to monitor voltage of the AC energy received from the electrical power system at the control panel interface between the site 8 and the utility which serves the site in the described embodiment. The sensed voltage at pin 4 may serve as a desired substantially sinusoidal waveform of current and be provided to processing circuitry 14 per FIG. 2 in one embodiment.

The purpose of the control signal circuit is to accept signals that are proportional to the magnitudes of the site's voltages and currents and to formulate the correction response to these signals that will make the site's electrical load current be more in phase and more sinusoidal. As mentioned above, the voltage signal provided by FIG. 4 is usually more sinusoidal than the current signal at the electrical panel of the site and may serve as the desirable load current (i.e., desired substantially sinusoidal waveform of current mentioned previously) which may be processed by the processing circuitry 14 as discussed further below in one embodiment. The output is therefore a signal proportional to the error between the actual magnitude of the site's electrical load current and the ideal, desirable electrical load current. One embodiment of the control signal circuit presents this error signal as a pulse-width-modulation ("PWM") output that can then be used directly to modulate the appliance's power electronic circuit via its driver circuits.

In this preferred embodiment of the invention, one additional input is used by the control signal circuit. This input scales the ideal, desirable load current (e.g., derived from the voltage signal at the interface of the utility and the site 8 and which is more sinusoidal than the corresponding current signal as discussed above) against which the actual site's electrical load current (e.g., measured by the example circuit of FIG. 3) is compared. By increasing the scale of the ideal load current, one increases power to the power quality improving appliance and increases the amount of improvement or correction that can be had by operating the appliance. By decreasing the scale of the ideal load current, one decreases the power to the power quality improving appliance and diminishes the degree to which the appliance can correct the site's current. The changes in this scaling factor generally occur slowly, compared to the 50 or 60-Hz waveshape. The magnitude of the scaling can be assigned as any beneficial function of (1) the site's need for power quality improvement (measured THD, for example), (2) the appliance's load demand (water temperature deficit, for example), (3) externally asserted demand signals, (4) grid frequency signals, (5) any other load objective. The appliance will also function with a constant applied scaling factor.

Figure 7:
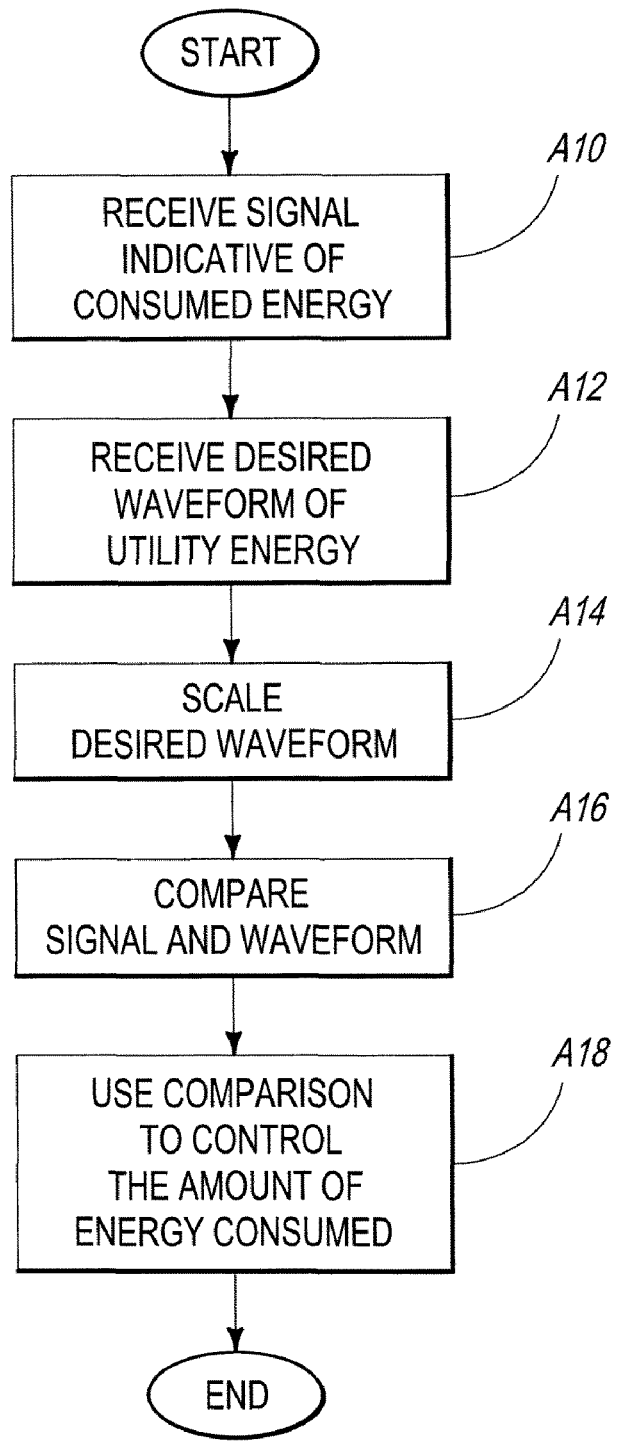
FIG. 7 is a flow chart of a method which may be performed to improve electrical ower factor and harmonic power quality at an interface between an electrical power system and a utility customer site according to one embodiment.

Referring to FIG. 7, a method executed by processing circuitry 14 is shown according to one embodiment.

At an act A10, a signal indicative of current of energy consumed by the loads at the site (e.g., the actual load current signal described above) is received by the processing circuitry from the monitoring circuitry. The signal may be provided by the circuitry of FIG. 3 is one embodiment.

At an act A12, the desired waveform of current of energy which is received at the site from the utility (e.g., desirable load current described above) is received by the processing circuitry. This signal may be derived from the voltage of the electrical power present at the interface of the utility and the site using the circuitry of FIG. 4 since the voltage is usually more sinusoidal than the current at the site electrical panel as mentioned above. Accordingly, in one embodiment, the desired waveform is substantially sinusoidal.

At an act A14, the desired waveform may be variably scaled to adjust the amount of the improvement or correction which may be provided by controlling the consumption of energy of one of the loads.

At an act A16, the signal indicative of current of the energy consumed and the desired waveform of current of energy received from the utility at the site are compared to determine error between the signals.

At an act A18, the determined error as a result of the comparison may be used to control the amount of energy consumed by at least one of the loads at the site to reduce variances between the signal which is indicative of the current of the energy consumed by the loads at the site and the desired waveform which results in increased power factor and reduction in harmonic pollution at the interface between the site and the utility or electrical power system.

Observe that the control signal circuit shares many attributes with commercially available power factor control integrated circuits like the Linear Technologies LT1249. Available power factor control integrated circuits are intended for control of the input stage of individual power electronic rectifier circuits. We are able to advantageously apply the functions of the power factor control integrated circuit to the control of the power quality improving appliance. While a power factor correction integrated circuit is not essential to the function of the appliance, the appliance may be considered a novel application for a power factor correction integrated circuit.

Figure 8:
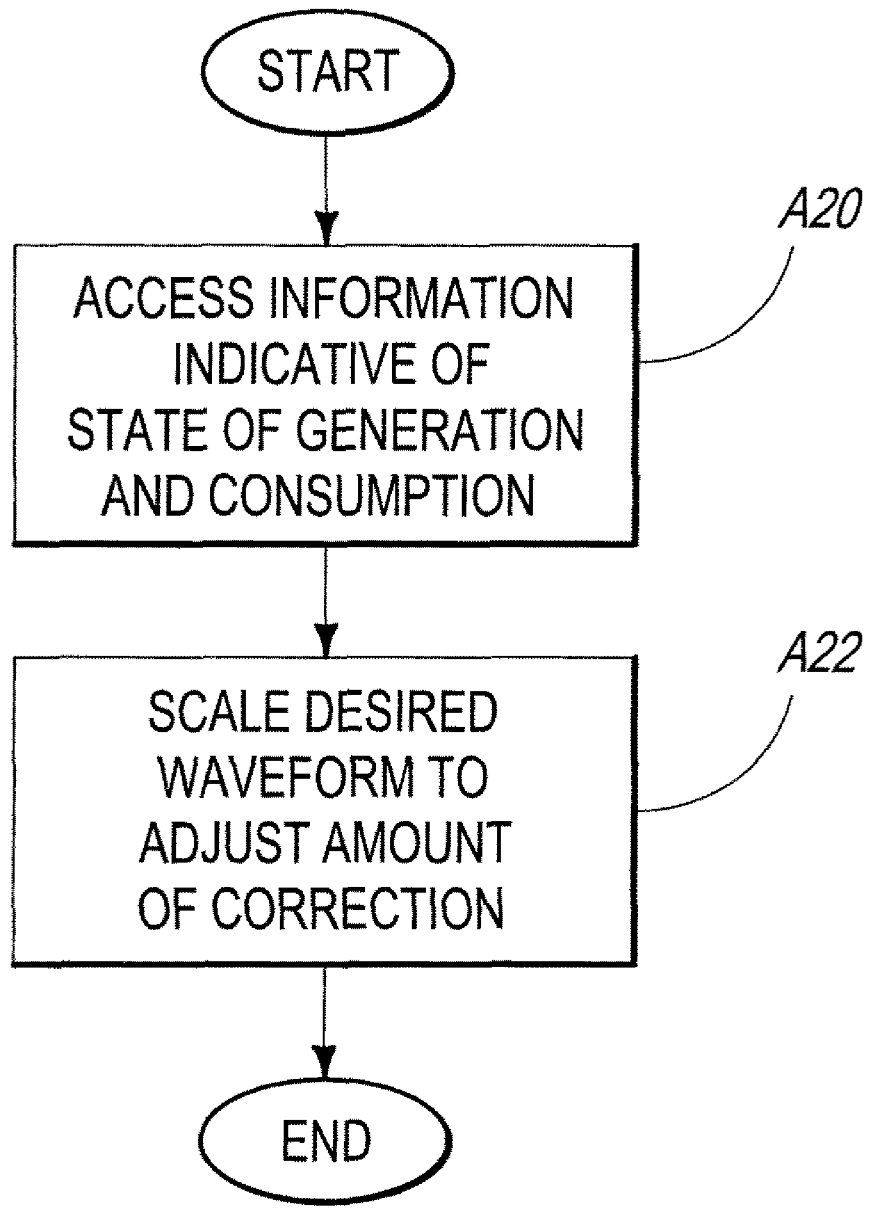
FIG. 8 is a flow chart of a method which may be performed to implement the scaling of FIG. 7 according to one embodiment.

Referring to FIG. 8, one method of performing the scaling of act A14 of FIG. 7 is shown according to one embodiment.

At an act A20, the processing circuitry may access information which may be used to adjust an amount of scaling of the desired waveform. In one example mentioned above, grid frequency signals which are indicative of generation and consumption of electrical energy of the electrical power system which supplies power to the site 8 may be used to assign the magnitude of the scaling. Other information may be accessed and utilized as set forth above, including for example, a site's need for power quality improvement, an appliance's load demand, externally asserted demand signals, or other load objectives.

At an act A22, the processing circuitry may utilize the accessed information of act A20, such as grid frequency signals which are indicative of generation and consumption of electrical energy of the electrical power system, to scale the desired waveform to adjust the amount of correction which is provided by controlling the amount of the electrical energy consumed by the power quality improving appliance to reduce variances between the signal which is indicative of current consumed at the site and the desired waveform.

The output of power factor correction integrated circuits is usually a PWM output. Depending on the assigned power electronic switch type of the appliance, the switching frequency may be either appropriate or inappropriate. For example, the output of the LT1249 is a 100-kHz PWM signal. This switching frequency may work directly for MOSFET power switches, but it is too fast for many contemporary IGBT power switches. The user may therefore have to supply circuitry that will reduce the PWM switching frequency while maintaining the duty cycle of the PWM signal.

In another embodiment of this invention, the error signal obtained from outputs of the power factor correction integrated circuit may be applied directly to control one or more transistors without employing a PWM signal, thereby both controlling the electric current of the power quality improving appliance and dissipating useful thermal energy directly from the controlled transistors.

Figure 5:
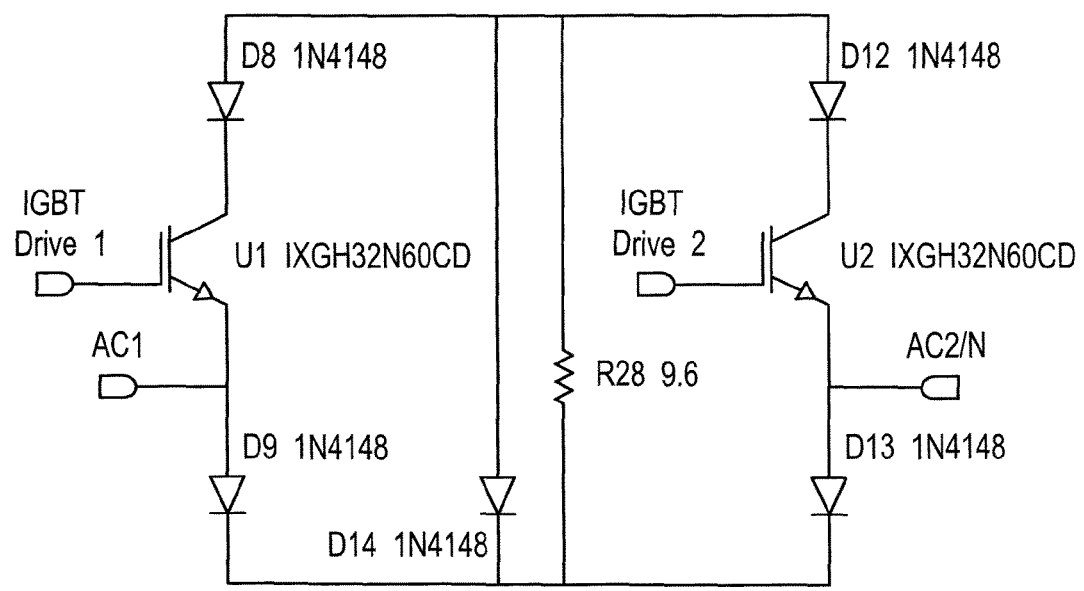
FIG. 5 is an example of one embodiment of a power quality improving appliance power electronic circuit of the present invention.

The purpose of the power electronic circuit block is to modulate the electrical power current used by the appliance. The power electronic circuit of FIG. 5 is failsafe in either the switches' conductive and non-conductive failure modes, the circuit functions like a bidirectional switch, directly controlling the applied ac voltage. No DC (direct current) energy storage buses are required. It accommodates inductive loading. The power switches may be identically driven by the same isolated PWM drive signal. The drivers for the two switches are referenced to the two line potentials. The driver circuit power supplies are easily designed using simple transformer power supply circuits. The driver circuits for the two power switches are nearly identical. The resistor shown in FIG. 5 dissipates power for the appliance. It could be the heating element of a water heater, space heater, or range. The element may be partially or completely inductive, too. Furthermore, the element need not be collocated with the remainder of the circuit, a fact that enables appliance retrofit markets for this invention. The uppermost diodes in the figure may be eliminated if the power switches have the ability to withstand reversed potentials. In the preferred embodiment, IGBT power switches were selected for their ease of switching and for their ruggedness and ability to withstand moderate voltages. This preference does not preclude the fabrication of power circuits with MOSFETs and other electronic power switches.

Figure 6:
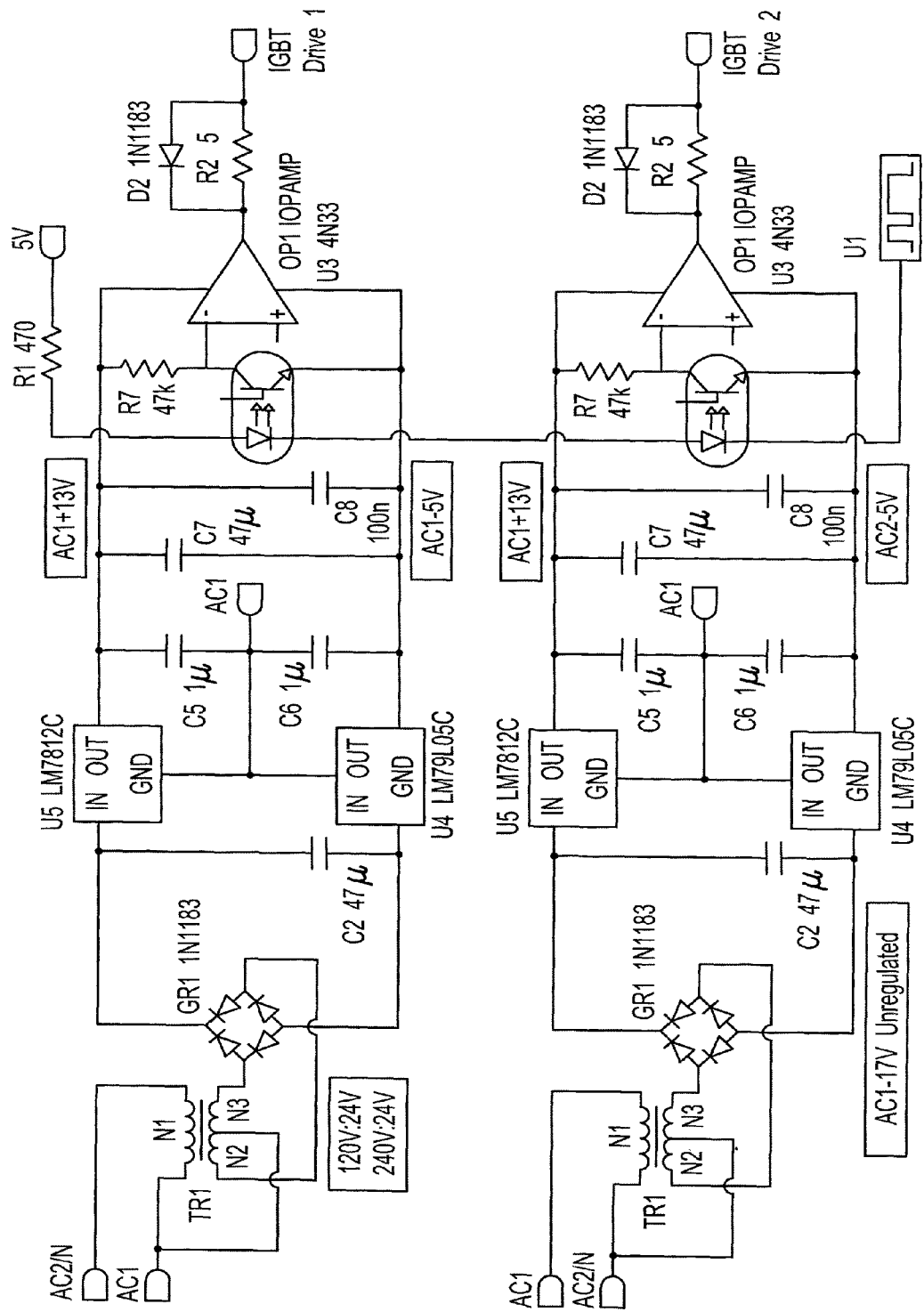
FIG. 6 is a power quality improving appliance driver circuits for two power IGBT switches.

Example driver circuits for two power quality improving appliance IGBT power switches are shown in FIG. 6. These driver circuits, with minor modifications, would be applicable to the control of a variety of MOSFET and IGBT and BJT transistors. These driver circuits are only examples of specific embodiments that would enable the present invention. Driver circuits must be designed for specific chosen power switches. The example selection of IGBT switches is not intended to narrow the applicability of this invention.

The shown driver circuits employ a transformer-coupled rectifier power supply circuit that creates a positive and negative unregulated rail voltage above and below the reference voltage. The reference voltage is established by connecting the power electronic circuit's reference voltage point to its respective driver's transformer center tap. The unregulated voltage sources are then connected to positive and negative linear voltage regulator circuits that establish regulated voltage rails both above and below the reference voltage. MOS gates are driven by about 15 Volts. A small negative voltage allows us to rapidly turn off the power electronic switches and to hold them off more reliably. This driver power supply circuit permits us to use ground referenced MOS drivers like the Maxim LT4420/9 6-ampere MOS driver chips. It is preferable that the MOS drivers' electronic switch's reference voltage be connected to the driver circuits via short, low impedance wires or traces.

A preferably PWM control signal is sent to the driver circuit via an optically isolated transistor. Depending on the appliance application, the control logic of the driver may be designed failsafe in either the on or off state of the power electronic switches. For water heating, where additional failsafe temperature control may exist, the drivers should be designed so as to fail in the conducting state should no control signal be received. Therefore, the failure of the driver circuit to receive a control signal still permits the power quality improving appliance to fulfill its function as a water heater.

The present invention provides a significant advantage over other devices in the prior art. Customer sites that fail to include one of the devices of the present invention may continue to exhibit and contribute to propagation of poor electric power factor and in poor harmonic power quality. This is the default situation in many locations, where almost no electricity consumers correct their own power quality. The growing prevalence of computers and other home electronic equipment will exacerbate power quality. Very bad power quality offenders may affect nearby electric power customers who have equipment that is intolerant of poor power quality. Hospitals, for example, place high importance on both electrical power quality and reliability. Presently, electric customers need adhere only to harmonic power quality limits imposed by standard IEEE-519. Some customers must also correct their own power factors. The alternative to the present invention includes costly active electric filters that fulfill a similar objective at an electrical site. The present invention provides a cost effective reliable and practical way to increase the efficiency of power systems and to avoid the various problems associated with poor power factor or poor harmonic power quality.

While various preferred embodiments of the invention are shown and described, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. An electrical energy consumption control apparatus comprising:
    processing circuitry configured to receive a signal which is indicative of current of electrical energy which is consumed by a plurality of loads at a site, to compare the signal which is indicative of current of electrical energy which is consumed by the plurality of loads at the site with a desired substantially sinusoidal waveform of current of electrical energy which is received at the site from an electrical power system, and to use the comparison to control an amount of the electrical energy which is consumed by at least one of the loads of the site.

2. The apparatus of claim 1 wherein the processing circuitry is configured to control the amount of the electrical energy which is consumed by at least one of the loads to reduce variances between the signal and the desired substantially sinusoidal waveform.

3. The apparatus of claim 1 wherein the processing circuitry is configured to control the amount of the electrical energy which is consumed by the at least one of the loads of the site to increase power factor and reduce harmonic pollution of the electrical energy at an interface between the site and the electrical power system.

4. The apparatus of claim 1 wherein the processing circuitry is configured to receive the desired substantially sinusoidal waveform of current of electrical energy which is received at the site from the electrical power system.

5. The apparatus of claim 1 wherein the processing circuitry is configured to scale the desired substantially sinusoidal waveform of current to adjust an amount of correction which is provided by the controlling of the amount of the electrical energy which is consumed by the at least one of the loads to reduce variances between the signal which is indicative of current and the desired substantially sinusoidal waveform of current.

6. The apparatus of claim 1 wherein the processing circuitry is configured to scale the desired substantially sinusoidal waveform of current using information which is indicative of a state of generation and consumption of electrical energy with respect to the electrical power system.

7. The apparatus of claim 1 wherein the processing circuitry is configured to control the amount of the electrical energy which is consumed by the at least one of the loads which is void of electrical energy storage circuitry.

8. The apparatus of claim 1 wherein the processing circuitry is configured to control the amount of the electrical energy which is consumed by at least one transistor of the at least one of the loads.

9. An electrical energy consumption control apparatus comprising:
    monitoring circuitry configured to monitor electrical energy which is received from an electrical power system at a site which includes a plurality of loads and to output signals which are indicative of the electrical energy which is received from the electrical power system at the site; and
    processing circuitry coupled with the monitoring circuitry and configured to receive the signals from the monitoring circuitry, to compare a desired waveform of the electrical energy received from the electrical power system at the site with respect to an actual waveform of the electrical energy received from the electrical power system at the site, and to use the comparison to control an amount of the electrical energy which is consumed by at least one of the loads of the site.

10. The apparatus of claim 9 wherein the processing circuitry is configured to compare the desired waveform with respect to the actual waveform to generate an error signal which is indicative of variances between the actual waveform and the desired waveform and to control the amount of the electrical energy which is consumed by the at least one of the loads of the site using the error signal to reduce the variances between the actual waveform and the desired waveform.

11. The apparatus of claim 9 wherein the desired waveform comprises a substantially sinusoidal waveform, and the processing circuitry is configured to use the comparison to selectively increase and decrease the amount of the electrical energy which is consumed by the at least one of the loads during different portions of the substantially sinusoidal waveform to reduce the variances between the actual waveform and the desired waveform.

12. The apparatus of claim 11 wherein the desired and actual waveforms are indicative of current of the electrical energy, and the processing circuitry is configured to control an amount of the electrical energy which is consumed by the at least one of the loads to reduce amplitude variances between the desired waveform and the actual waveform.

13. The apparatus of claim 12 wherein the actual waveform is indicative of the current of the electrical energy which is consumed by the loads of the site.

14. The apparatus of claim 9 wherein the processing circuitry is configured to control the amount of the electrical energy which is consumed by the at least one of the loads to increase power factor and reduce harmonic pollution of the electrical energy at an interface between the site and the electrical power system.

15. The apparatus of claim 9 wherein the processing circuitry is configured to control the amount of the electrical energy which is consumed by the at least one of the loads which is void of electrical energy storage circuitry.

16. The apparatus of claim 9 wherein the processing circuitry is configured to control the amount of the electrical energy which is consumed by at least one transistor of the at least one of the loads.

17. The apparatus of claim 9 wherein the actual waveform comprises a waveform of current of the electrical energy, and the processing circuitry is configured to determine the desired waveform comprising a waveform of the current of the electrical energy using a voltage waveform of the electrical energy which is received at the site from the electrical power system.

18. The apparatus of claim 17 wherein the processing circuitry is configured to scale the voltage waveform to generate the desired waveform.

19. The apparatus of claim 18 wherein the processing circuitry is configured to vary an amount of the scaling to adjust an amount of correction which is provided by the controlling of the amount of the electrical energy which is consumed by the at least one of the loads to reduce variances between the desired waveform and the actual waveform.

20. The apparatus of claim 18 wherein the processing circuitry is configured to vary an amount of the scaling using information which is indicative of a state of generation and consumption of electrical energy with respect to the electrical power system.

21. An electrical energy consumption control method comprising:
  receiving electrical energy from an electrical power system at a site which includes a plurality of loads;
  monitoring a characteristic of the received electrical energy;
  generating a desired representation of the characteristic; and
  using the monitored characteristic of the received electrical energy and the desired representation of the characteristic, controlling an amount of the electrical energy which is consumed by at least one of the loads of the site.

22. The method of claim 21 further comprising determining variances between the monitored characteristic of the electrical energy and the desired representation of the characteristic, and wherein the controlling comprises controlling to reduce the variances between the monitored characteristic of the electrical energy and the desired representation of the characteristic.

23. The method of claim 21 wherein the desired representation of the characteristic comprises a substantially sinusoidal waveform, and the controlling comprises controlling to selectively increase and decrease the amount of the electrical energy which is consumed by the at least one of the loads during different portions of the substantially sinusoidal waveform to reduce variances between the monitored characteristic and the substantially sinusoidal waveform.

24. The method of claim 21 wherein the controlling comprises controlling to increase power factor and reduce harmonic pollution of the received electrical energy at an interface between the site and the electrical power system.

25. The method of claim 21 wherein the controlling comprises controlling the amount of the electrical energy which is consumed by the at least one of the loads which is void of electrical energy storage circuitry.

26. The method of claim 21 wherein the controlling comprises controlling the amount of the electrical energy which is consumed by at least one transistor of the at least one of the loads.

27. The method of claim 21 wherein the monitored characteristic comprises a waveform of current of the received electrical energy, and the generating comprises generating the desired representation of the characteristic comprising another waveform of current using a voltage waveform of the received electrical energy.

28. The method of claim 27 wherein the generating comprises scaling the voltage waveform to generate the desired representation of the characteristic.

29. The method of claim 28 further comprising varying an amount of the scaling to adjust an amount of correction which is provided by the controlling the amount of the electrical energy which is consumed by the at least one of the loads of the site to reduce variances between the monitored characteristic and the desired representation of the characteristic.

30. The method of claim 28 further comprising varying an amount of the scaling using information which is indicative of a state of generation and consumption of electrical energy with respect to the electrical power system.

31. The apparatus of claim 1 wherein the site is located at a customer premises which is remote from sources of the electrical power system which generate the electrical energy, and wherein the signal which is indicative of current of electrical energy which is consumed by the plurality of loads at the site is not indicative of electrical energy from the electrical power system which is consumed by other loads which are not at the site of the customer premises.

32. The apparatus of claim 1 wherein the site is located at a customer premises which is remote from sources of the electrical power system which generate the electrical energy, and wherein the signal which is indicative of current of electrical energy which is consumed by the plurality of loads at the site is generated at the site of the customer premises after transmission of the electrical energy from the sources to the site of the customer premises via a grid of the electrical power system.

33. The apparatus of claim 1 wherein the site is located at a customer premises, and further comprising monitoring circuitry located at the customer premises and which is configured to:
  monitor the electrical energy which is received at the site from a grid of the electrical power system; and
  as a result of the monitoring, output the signal which is indicative of current of electrical energy which is consumed by the plurality of loads at the site and the desired substantially sinusoidal waveform of current.

34. The apparatus of claim 9 wherein the site is located at a customer premises which is remote from sources of the electrical power system which generate the electrical energy, and wherein the monitoring circuitry is located at the site of the customer premises, and wherein the monitoring circuitry is configured to:
  monitor the electrical energy after transmission of the electrical energy, via a grid of the electrical power system, from the sources to the site of the customer premises; and
  as a result of the monitoring, generate the desired waveform of the electrical energy received from the electrical power system at the site and the actual waveform of the electrical energy received from the electrical power system at the site.

35. The method of claim 21 wherein the site is located at a customer premises, and wherein the monitoring and the generating comprise monitoring and generating using circuitry which is located at the site of the customer premises.

* * * * *

UNITED STATES PATENT AND TRADEMARK OFFICE
CERTIFICATE OF CORRECTION

| | | |
|---|---|---|
| PATENT NO. | : 8,258,761 B2 | |
| APPLICATION NO. | : 12/181954 | |
| DATED | : September 4, 2012 | |
| INVENTOR(S) | : Donald J. Hammerstrom | |

It is certified that error appears in the above-identified patent and that said Letters Patent is hereby corrected as shown below:

In the Specifications:

Column 4, line 30 – Replace "electrical ower" with -- electrical power --

Signed and Sealed this
Seventh Day of May, 2013

Teresa Stanek Rea
*Acting Director of the United States Patent and Trademark Office*